(12) United States Patent
Tien et al.

(10) Patent No.: US 8,218,113 B2
(45) Date of Patent: Jul. 10, 2012

(54) PIXEL STRUCTURE OF DISPLAY AND METHOD FOR MANUFACTURING THE SAME

(75) Inventors: Ming-Feng Tien, Tainan (TW); Kun-Yu Lin, Hsinchu (TW); Po-Lun Chen, Chiayi (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 13/359,840

(22) Filed: Jan. 27, 2012

(65) Prior Publication Data

US 2012/0129286 A1    May 24, 2012

Related U.S. Application Data

(62) Division of application No. 11/798,801, filed on May 17, 2007, now Pat. No. 8,130,346.

(30) Foreign Application Priority Data

Sep. 27, 2006  (TW) .............................. 95135846 A

(51) Int. Cl.
  *G02F 1/1333*  (2006.01)
(52) U.S. Cl. ........................................................ 349/110
(58) Field of Classification Search .................. 349/110, 349/104
  See application file for complete search history.

(56) References Cited

U.S. PATENT DOCUMENTS

| | | | |
|---|---|---|---|
| 6,661,488 B1 | 12/2003 | Takeda et al. | |
| 6,724,452 B1 | 4/2004 | Takeda et al. | |
| 6,888,602 B2 | 5/2005 | Takeda et al. | |
| 6,897,929 B2 | 5/2005 | Takeda et al. | |
| 6,927,824 B1 | 8/2005 | Takeda et al. | |
| 2002/0067450 A1 | 6/2002 | Moriya | |
| 2003/0202145 A1 | 10/2003 | Takizawa et al. | |

FOREIGN PATENT DOCUMENTS

| | | |
|---|---|---|
| JP | 2002173105 | 6/2005 |
| JP | 2005173105 | 6/2005 |

OTHER PUBLICATIONS

Taiwanese Official Action corresponding to Taiwanese Application No. 95135846, 1999.

*Primary Examiner* — Eric Wong
(74) *Attorney, Agent, or Firm* — Bacon & Thomas, PLLC

(57) ABSTRACT

A pixel structure of a display including a first substrate, a second substrate, and a liquid crystal (LC) layer disposed therebetween. The pixel structure comprises a plurality of first, second, and third sub-pixels; a plurality of alignment controlling patterns, respectively formed in the first, second and third sub-pixels for controlling alignment direction of LC molecules of the LC layer; a plurality of opaque regions, respectively formed in the first, second, and third sub-pixels, and substantially aligned with the portion of the alignment controlling patterns, so that the alignment controlling patterns are shielded by the substantially corresponded opaque regions having different areas in at least two of the colored sub-pixels.

11 Claims, 16 Drawing Sheets

PIXEL STRUCTURE OF DISPLAY AND METHOD FOR MANUFACTURING THE SAME

This application is a divisional application of co-pending application Ser. No. 11/798,801, filed on May 17, 2007, which claims the benefit of Taiwan application No. 95135846, filed on Sep. 27, 2006, the contents of which are incorporated herein by reference.

BACKGROUND OF THE INVENTION

1. Field of the Invention

The present invention relates to a pixel structure of display, and more particularly, to a pixel structure capable of improving the color-shifting of display.

2. Description of the Related Art

Due to the advantages of light weight, thinness depth, small volume, and lower radiation, the liquid crystal displays (LCD) of the flat-panel display whose display effect is much superior to that of a cathode ray tube (CRT) display has attracted the public interest in recent years. The consumers also request the preferably images displayed in the LCD.

According to the propagation direction of the ray manner, LCD can be categorized into three types: transmissive type, reflective type, and transflective type. In the transmissive type LCD, the light source is provided by a backlight source, and has the advantages of good image display under the environment having normal light and the dark. However, it is difficult to clearly view or to recognize the image display of the transmissive type LCD under the sunlight (for example, the user want to use the LCD in outdoors). In the reflective type LCD, ambient light is used as the light source (i.e. no backlight system), so that good image display is presented in indoors filled with light or outdoors. Also, the power consumption of the reflective type LCD is lower than that of the transmissive type LCD. The transflective type LCD, possessing the advantages of the transmissive type and reflective type LCDs, has been applied in the portable electronic products such as cellular phone, personal digital assistant (PDA), etc.

In general, a LCD is assembled by an upper substrate and a lower substrate. The space between the upper substrate and the lower substrate is filled with liquid crystal layer having numerous LC molecules. The polarization direction of the light passing through the liquid crystal layer is modulated by changing the arrangement direction (i.e. alignment direction) of the liquid crystal molecules that is varying with a voltage applied to the pixel electrode. In this way, the polarized reflected light has the brightness corresponding to the voltage applied to the pixel electrode. When a voltage is applied to the pixel electrodes, the arrangement direction of the liquid crystal molecules is to be varied so that the light transmission changes. Thus, the LCD can display images with different brightness such as white, black, and the different gray scale, in which including the intermediate of the gray scale. In addition, the liquid crystal molecules of the LCD can be categorized into twisted nematic (TN) mode and vertical alignment (VA) mode. When a voltage is not applied to the pixel electrodes, the TN mode liquid crystal molecules gradually twist layer by layer from one of the liquid crystal molecules of the substrates to another of the liquid crystal molecules of the substrates having a angle, for example, the uppermost layer of the liquid crystal molecules near the upper substrate to the bottom layer of the liquid crystal molecules near the lower substrate having a 90° angle. When a sufficient voltage is applied, the TN mode liquid crystal molecules are to be aligned and parallel to the direction of the electric field. The VA mode liquid crystal molecules, differently, are aligned and perpendicular to the upper and lower substrates when a voltage is not applied, and are twisted a 90° angle to be aligned and parallel to the upper and lower substrates when a sufficient voltage is applied.

For an LCD panel with a large size, such as panel used in a notebook, multi-domains in every pixel of the panel are formed to make high resolution and wide viewing angle of LCD displays.

FIG. 1A and FIG. 1B illustrate the arrangement of multi-domains liquid crystal molecules in vertical alignment mode of an LCD panel when a voltage is applied and not applied to the panel, respectively. The upper substrate structure (i.e. the first substrate structure) 10 and the lower substrate structure (i.e. the second substrate structure) 20 are assembled in parallel and the space between them is filled with a liquid crystal layer 30 containing numerous liquid crystal molecules 302. The lower substrate structure 20 includes a substrate (such as a glass substrate) 202 on which a thin film transistor (TFT), the metal layer(s), and the insulating layer(s) (those device and layers not being shown in figures) are formed. A pixel electrode 204 is disposed above the insulating layer and is covered with an alignment film 206. As shown, each of the pixel electrodes 204 is isolated with the spacing 208, and the bottoms of the spacings 208 are covered with the alignment film 206. The upper substrate structure 10 includes a first substrate (such as a glass substrate) 102, a transparent electrode (such as ITO electrode) 104, and an alignment film 106. Also, a protrusion 108 is formed at the upper substrate structure 10 and is covered with the alignment film 106.

As shown in FIG. 1A, when no voltage is applied to the panel, most of the liquid crystal molecules 302 are aligned vertically to the pixel electrode 204. The liquid crystal molecules 302 adjacent to the protrusion 108 are arranged substantially vertical to the surfaces of the protrusion 108, and have an inclination to the pixel electrode 204. Thus, the protrusion 108 provides a pre-tilt angle for the liquid crystal molecules 302 while no voltage is applied.

As shown in FIG. 1B, when a voltage is applied to the panel, two different domains are formed in a single pixel because of the different inclinations of the molecules 302 on the left and right sides of the protrusion 108. To be more specific, the electric field affects the LC molecules, so as to let the LC molecules adjacent to the left side of the protrusion 108 affect the left portion of the liquid crystal molecules 302 of the pixel, so that the left portion of LC molecules incline towards the right side. Likewise, the electric field affects the LC molecules, so as to let the LC molecules adjacent to the right side of the protrusion 108 affect the right portion of the liquid crystal molecules 302 of the pixel, resulting in the inclination of right portion of LC molecules towards the left side. FIG. 1A and FIG. 1B show the example with only two domains in one single pixel. By changing the shape of the protrusion 108, multiple domains can be similarly implemented, leading to a wide viewing angle of display. However, the protrusion 108 can easily cause the problem of light leaking.

Besides formation of the protrusions 108, multiple domains can be achieved by forming the slits at the pixel electrode. Each pixel area can be divided into several domains by the slits. When a voltage is applied to the panel, a slanted electric field is generated adjacent to the edges of the pixel electrode (cut by the slits) so as to cause the inclination of LC molecules near the slits. Those inclined LC molecules affect the other LC molecules, so that multi-domains within a pixel and wide viewing angle of display can be obtained.

Referring to FIG. 2A, FIG. 2B and FIG. 2C, for illustrating the substrate having TFT structure. FIG. 2A is a cross-sectional view taken along the line 2A-2A of FIG. 2C illustrating a thin film transistor (TFT) of a second substrate (lower substrate) structure of LCD. FIG. 2B is a cross-sectional view taken along the line 2B-2B of FIG. 2C illustrating a storage capacitor ($C_{ST}$) of a second substrate structure of LCD. FIG. 2C schematically illustrates a single sub-pixel of a multi-domain vertical alignment (MVA) mode of the TFT-LCD. Also, the TFT-LCD shown in FIG. 2C is a "$C_{ST}$ on common" (i.e. storage capacitors on a common electrode) design.

A conventional TFT-LCD is assembled by a first substrate structure (or upper substrate structure) and a second substrate structure (or lower substrate structure). The first substrate structure comprises a number of transparent pixel electrodes, color filters, and black matrices. The second substrate structure comprises a number of scan lines, data lines, storage capacitors, switching elements (e.g., TFTs), and transparent pixel electrodes. In the TFT-LCD, the data lines perpendicularly intersect the scan lines to form a number of pixel regions. In a full-color LCD display, each pixel consists of three sub-pixels: red, green, and blue (RGB) sub-pixels, and each sub-pixel is controlled by a TFT. Also, each sub-pixel region is defined by a pair of scan lines and the corresponding data lines. Each sub-pixel region includes a storage capacitor $C_{ST}$, a TFT, and a pixel electrode (e.g. a transparent ITO). FIG. 2O can be represented as one of single R, G, or B sub-pixel of full-color displays.

As shown in FIG. 2A (taken along the cross-sectional line 2A-2A of FIG. 2C), the second substrate structure comprises a second substrate 202 and a gate electrode 212 is formed (by patterning a first metal layer) on the second substrate 202. A first insulating layer 213 is formed on the second substrate 202 and covers the gate electrode 212. An amorphous-Si (a-Si) layer is formed on the first insulating layer 213 and then patterned to form a channel 215. Drain (D) and source (S) are formed on the first insulating layer 213, by patterning a second metal layer. Next, a passivation layer 216 is formed on the drain (D) and the source (S) and covers the first insulating layer 213. A contact hole 217 is then formed within the passivation layer 216 to expose the partial surface of source (S)/drain (D). Finally, a pixel electrode (e.g. transparent ITO) 204 is formed on the passivation layer 216 and fills the contact hole 217, so that the pixel electrode 204 is coupled to source (S)/drain (D).

The scan lines and data lines are respectively formed during the patterning step of forming the gate electrode 212 and source (S)/drain (D), respectively. Also, the scan lines and data lines are isolated by the first insulating layer 213.

As shown in FIG. 2B (taken along the cross-sectional line 2B-2B of FIG. 2C), a storage capacitor ($C_{ST}$) includes a common electrode 214 and a capacitor electrode 218. The common electrode 214 and the capacitor electrode 218 are separated by the first insulating layer 213. The storage capacitor ($C_{ST}$) is formed together with the formation of the TFT. The common electrode 214 is formed after the formation and patterning of the first metal layer. Likewise, after the formation and patterning of the second metal layer, the capacitor electrode 218 is formed. The passivation layer 216 covers the capacitor electrode 218 and the first insulating layer 213. A contact hole 219 is further formed within the passivation layer 216. When the pixel electrode 204 is formed over the passivation layer 216, the pixel electrode 204 and the capacitor electrode 218 are electrically coupled through the contact hole 219. In addition, all of the common electrode 214 of the pixels are connected to each other, and connected to a common voltage of the TFT-LCD.

As shown in FIG. 2C, each R, G, or B sub-pixel is controlled by the data line (DL) and the scan line (SL). Each sub-pixel comprises a thin film transistor (TFT) 27, a pixel electrode (PE) 204, and a common electrode ($V_{COM}$) of the storage capacitor. The common electrode ($V_{COM}$) of FIG. 2C is the patterned first metal layer (denoted as 214) of FIG. 2B. The patterned second metal layer is as capacitor electrode 218 and is formed above the common electrode ($V_{COM}$), and the pixel electrode 204 on the top is electrically connected to the capacitor electrode 218 through the contact hole 219. Also, several slits 220 are formed in the pixel electrode 204 to acquire a result of the multi-domains and wide viewing angle. Furthermore, a protrusion 108 formed on the first substrate structure 10 is also demonstrated in FIG. 2C, for being used as another structure to achieve multi-domains and wide viewing angle effect.

Although multi-domains and wide viewing angle effect of display can be achieved by forming the protrusions 108 (as shown in FIG. 1A and FIG. 1B) or/and the slits 220 (as shown in FIG. 2C), the protrusions 108 or/and the slits 220 can cause the considerable problem of light leakage in the dark-state. Typically, the conventional display is not completely dark when it is in a dark-state. Also, the differences of light-leaking amounts of the RGB sub-pixels cause the color-shifting problem. The conventional display usually occurs a color of dark with a tendency of blue (not completely dark) when it is in a dark-state.

SUMMARY OF THE INVENTION

It is therefore an object of the present invention to provide a pixel structure of display having an opaque region to shield the alignment controlling patterns, so that the color of display can be effectively improved.

According the aspect of the present invention, a pixel structure of a display including a first substrate, a second substrate, and a liquid crystal (LC) layer disposed therebetween. The pixel structure comprises a plurality of first, second, and third sub-pixels; a plurality of alignment controlling patterns formed in the first, second and third sub-pixels; and a plurality of opaque regions formed in the first, second, and third sub-pixels, and substantially aligned with at least portion of the alignment controlling patterns, so that the opaque regions are substantially overlapped with at least portion of the alignment controlling patterns having a shielding area in at least two of the colored sub-pixels is substantially different from each other.

According the aspect of the present invention, a method for manufacturing a pixel structure of a display including a first substrate, a second substrate, and a liquid crystal (LC) layer interposed therebetween is provided. The method comprises: forming a plurality of first, second, and third sub-pixels; forming a plurality of alignment controlling patterns in the first, second, and third sub-pixels; forming a plurality of opaque regions in the first, second, and third sub-pixels, and substantially aligned with at least portion of the alignment controlling patterns, so that the opaque regions are substantially overlapped with at least portion of the alignment controlling patterns having a shielding area in at least two of the colored sub-pixels is substantially different from each other.

According the aspect of the present invention, a method for manufacturing a display is provided, and the method comprises: providing a first substrate structure and a second substrate structure; forming a plurality of first, second, and third sub-pixels on the first substrate structure and the second substrate structure; forming a plurality of alignment controlling patterns in the first, second, and third sub-pixels; forming a plurality of opaque regions in the first, second, and third sub-pixels, and substantially aligned with at least portion of the alignment controlling patterns, so that the opaque regions are substantially overlapped with at least portion of the alignment controlling patterns having a shielding area in at least two of the colored sub-pixels is substantially different from each other; and assembling a liquid crystal (LC) layer between the first substrate structure and the second substrate structure.

Other objects, features, and advantages of the present invention will become apparent from the following detailed description of the preferred but non-limiting embodiments. The following description is made with reference to the accompanying drawings.

DETAILED DESCRIPTION OF PREFERRED EMBODIMENTS

Figure 1A:
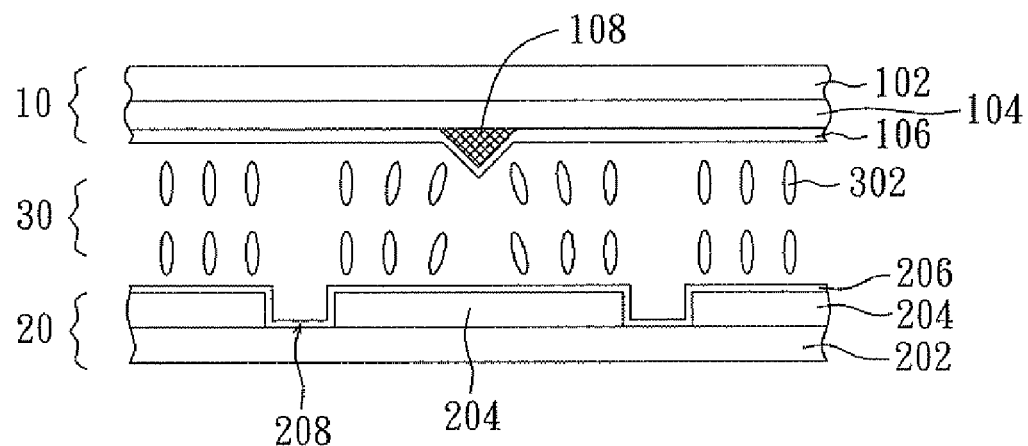
FIG. 1A and FIG. 1B illustrate the arrangement of multi-domain liquid crystal molecules in vertical alignment mode of an LCD panel when a voltage is applied and not applied to the panel, respectively.
Figure 1B:
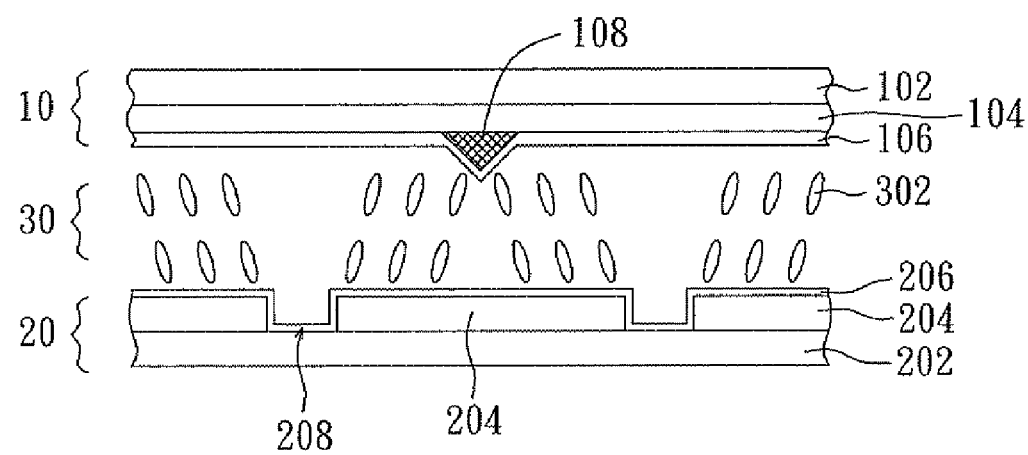
Figure 2A:
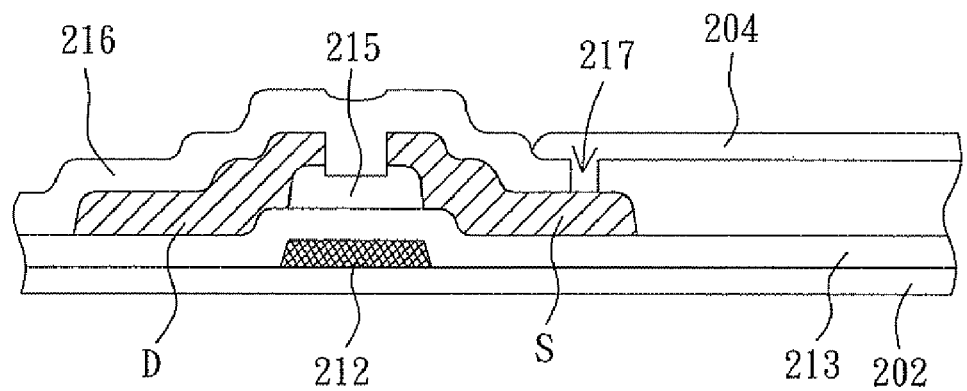
FIG. 2A is a cross-sectional view taken along the line 2A-2A of FIG. 2C illustrating a thin film transistor (TFT) of a second substrate structure of LCD.
Figure 2B:
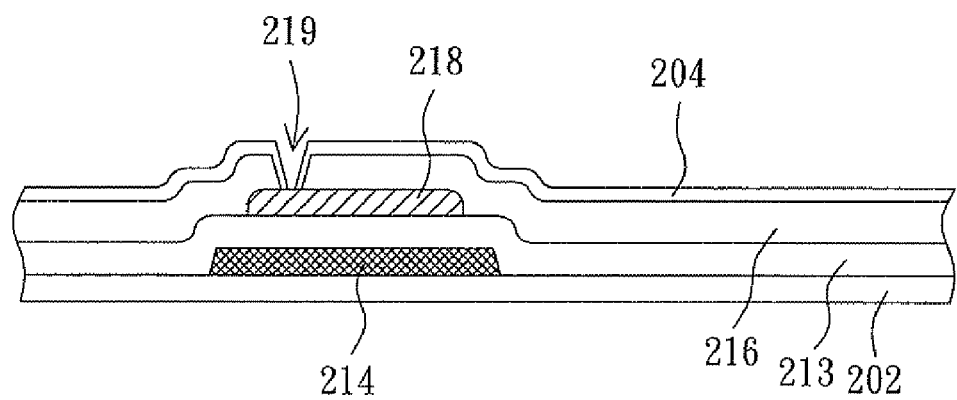
FIG. 2B is a cross-sectional view taken along the line 2B-2B of FIG. 2C illustrating a storage capacitor ($C_{ST}$) of a second substrate structure of LCD.
Figure 2C:
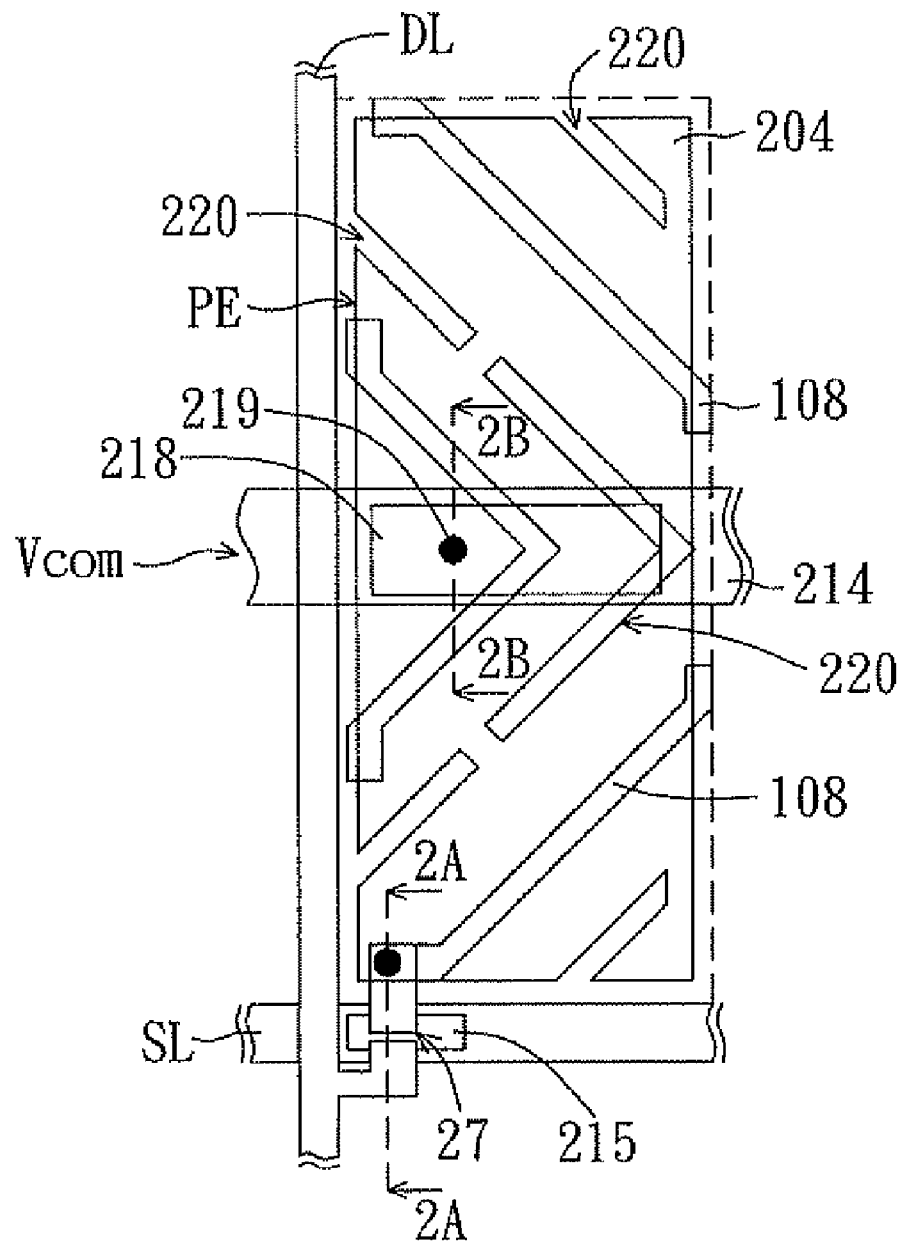
FIG. 2C schematically illustrates a single sub-pixel of a multi-domain vertical alignment (MVA) mode TFT-LCD.

A pixel structure capable of improving the color of display, in particular, improving the dark-state color of display, is provided in the present invention. In the present invention, the alignment controlling patterns (i.e. the objects causing light-leaking problem), such as protrusions and/or slits formed on the first and/or second substrates, are adequately shielded by opaque regions. The opaque regions could be formed by parts of black matrix (such as photo-resist, or the like), metals, or others, or combinations thereof. The light leakage amount of each sub-pixel is reduced by the shielding of the opaque region. The alignment controlling patterns in at least portion of the sub-pixels are optionally shielded by the corresponding opaque regions having different areas, so that the light-leaking amounts in the sub-pixels (such as R, G, B, or the like) differ from each other. Thus, the conventional color-shifting problem (caused by the differences of light-leaking amounts of the RGB sub-pixels) can be effectively solved, particularly when the display is in the dark-state.

A pixel structure of a display includes a first substrate, a second substrate, and a liquid crystal (LC) layer interposed therebetween. The pixel structure comprises a plurality of first, second, and third sub-pixels; a plurality of alignment controlling patterns formed in the first, second and third sub-pixels for controlling alignment direction of LC molecules; a plurality of opaque regions formed in the first, second, and third sub-pixels, and substantially aligned with at least portion of the alignment controlling patterns. The alignment controlling patterns of at least two different colored sub-pixels of the sub-pixels are shielded by the corresponded opaque regions having different areas. According to the embodiments of the present invention, the first, second, and third sub-pixels adapted to emit red, green, and blue colors of light are as the exemplification of the present invention. However, the present invention is not limited herein, other colors assigned to areas on the commission international de I, eclairage (CIE) chromaticity diagram, such as purple, yellow-green, orange-red, red-brown, yellow, indigo blue, or the other colors, can be the light colors emitted from the sub-pixels.

Several embodiments of the present invention, including the first, second, third, and four embodiments, are disclosed according to different types of alignment controlling patterns. However, the embodiments disclosed herein merely illustrate the present invention, and the scope of the present invention is not limited thereto. The pixel structures of the embodiments of the present invention are applied to a thin film transistor-liquid crystal display (TFT-LCD) panel for illustration. Referring to FIG. 1A~FIG. 1B, FIG. 2A~FIG. 2C, which depict the TFT-LCD panel in details. Also, the same components depicted in the embodiments of the present invention are denoted by the same reference numbers. Additionally, in order to avoid obscuring the invention, the drawings used for illustrating the embodiments of the present invention only show the major characteristic parts including the alignment controlling pattern and the corresponding opaque region within a single sub-pixel (R, G, or B sub-pixels). Accordingly, the specification and the drawings are to be regarded in an illustrative sense rather than in a restrictive sense.

First Embodiment

In the first embodiment of the present invention, the upper substrate structure (i.e. the first substrate structure) has the protrusions, and the protrusions are as an alignment controlling pattern in the TFT-LCD.

Figure 3:
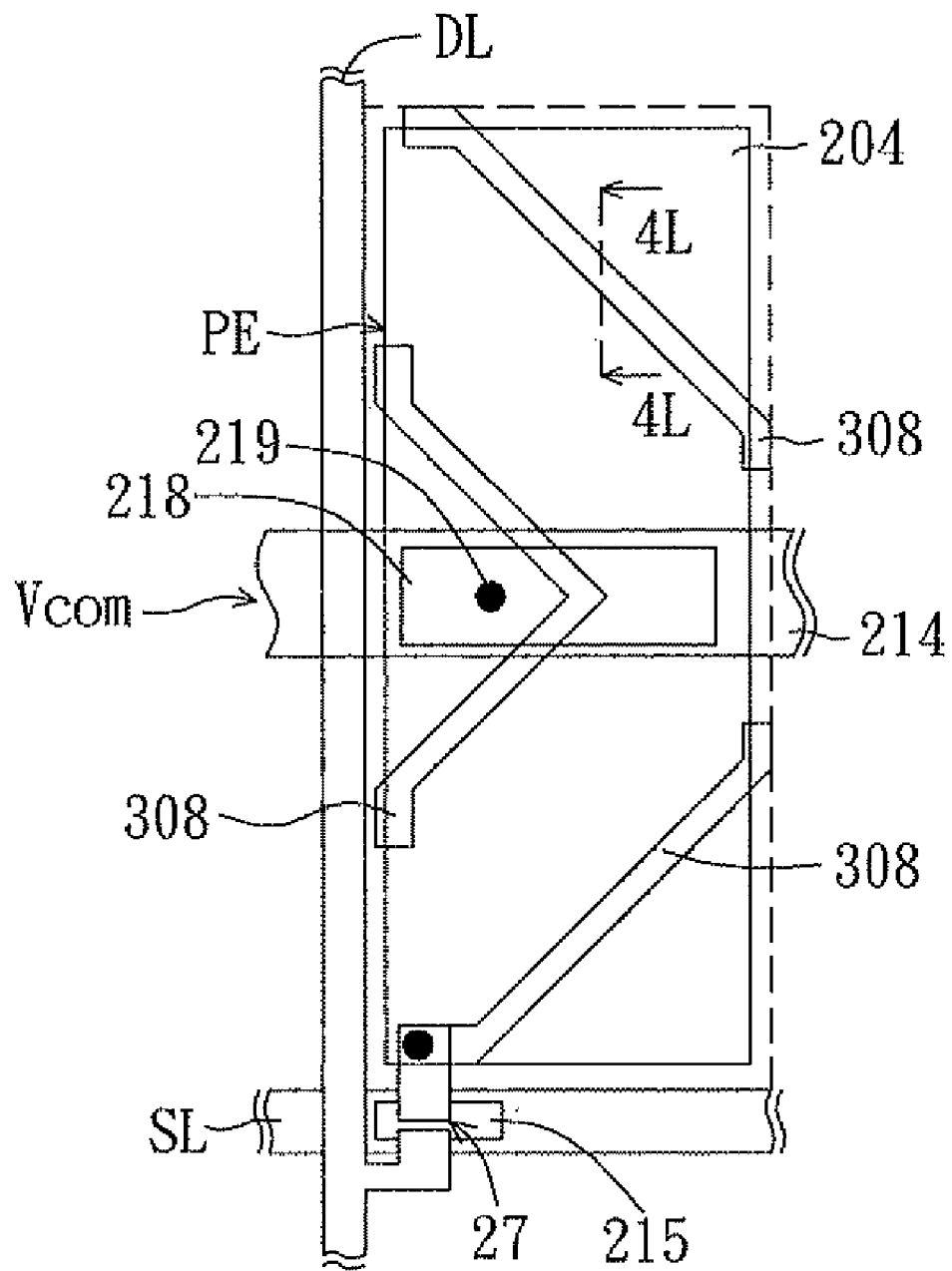
FIG. 3 illustrates the protrusions formed in a single sub-pixel of the display according to the first embodiment of the present invention.
Figure 4A:
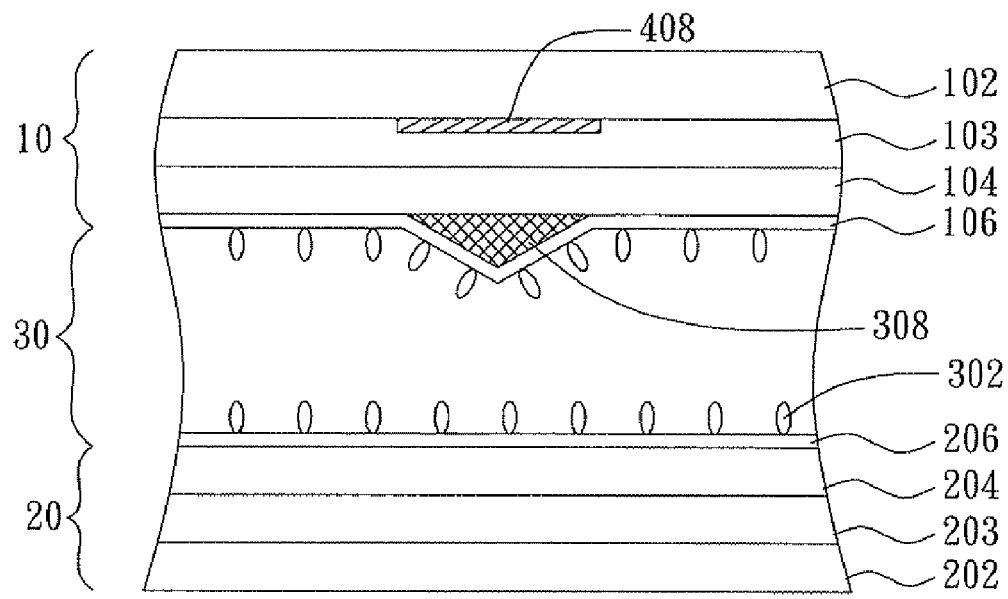
FIG. 4A~FIG. 4B are cross-sectional views taken along the line 4L-4L of FIG. 3, wherein a black matrix and a metal are used as opaque regions for shielding the protrusions, respectively.
Figure 4B:
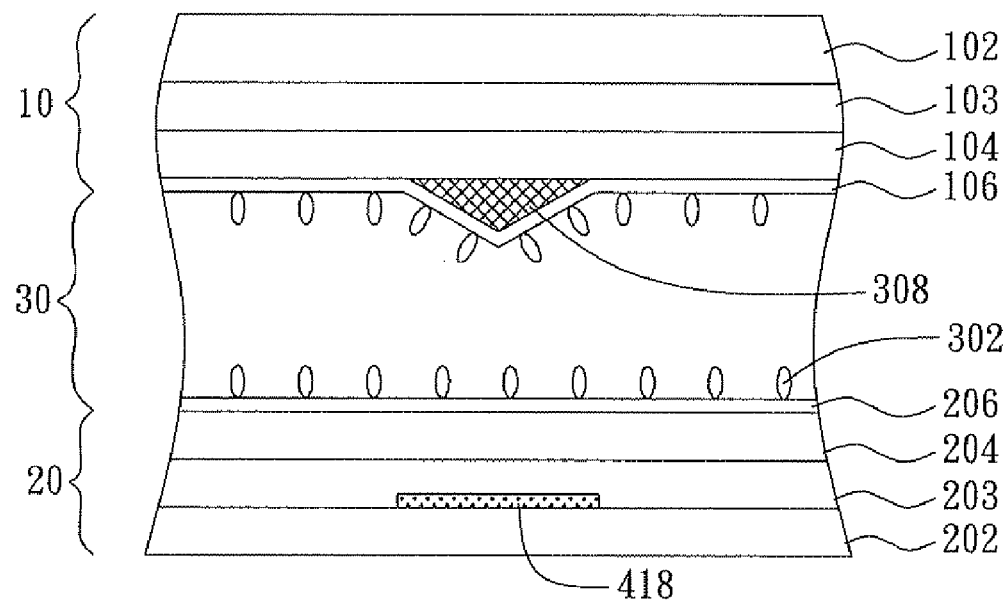
Figure 5A:
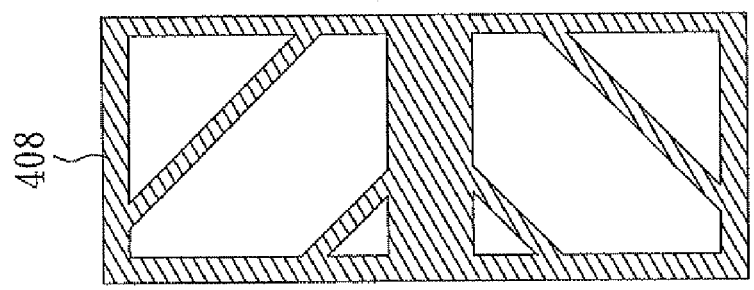
FIG. 5A~FIG. 5B are top views illustrating the black matrix of FIG. 4A covering half area of protrusions and all of protrusions, respectively.
Figure 5B:
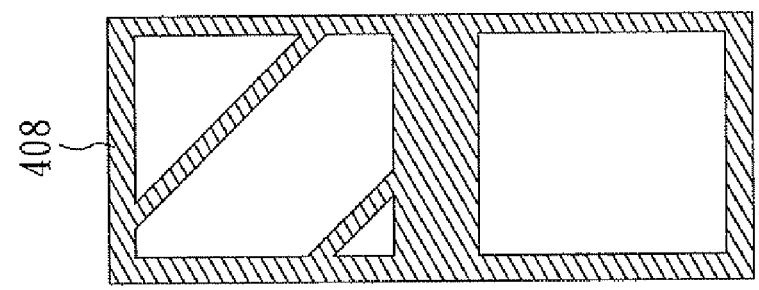

Referring to FIG. 3, FIG. 4A~FIG. 4B and FIG. 5A~FIG. 5B. FIG. 3 illustrates the protrusions formed in a single sub-pixel of the TFT-LCD according to the first embodiment of the present invention. FIG. 4A~FIG. 4B are cross-sectional views taken along the line 4L-4L of FIG. 3, wherein a black matrix and a metal are used as opaque regions to shield the protrusions, respectively. FIG. 5A~FIG. 5B are top views illustrating the black matrix of FIG. 4A covering half area of protrusions and all of protrusions, respectively.

As shown in FIG. 3, each sub-pixel (R, G, or B sub-pixels), controlled by a data line (DL) and a scan line (SL), and comprises a thin film transistor (TFT) 27 and a pixel electrode (PE) 204. A storage capacitor (CST) includes a common electrode (VCOM) 214 and/or at least one of a capacitor electrode 218 and a portion of the pixel electrode 204. By example, the capacitor electrode 218 (formed by patterning the second metal layer) is positioned above the common electrode (VCOM) 214, and the most upper pixel electrode 204 disposed on the capacitor electrode 218 and is electrically connected to the capacitor electrode 218 through the contact hole 219. Also, the upper substrate structure (i.e. the first substrate structure) has several protrusions 308, and the protrusions 308 are as the alignment controlling pattern herein. When the upper substrate structure is assembled to the lower substrate structure, the purposes of multi-domains and wide viewing angle effect can bed achieved due to the existence of those protrusions 308. FIG. 3 also shows a single sub-pixel with the positions of protrusions 308.

In the present embodiment of the invention, at least one of black matrix and metal used as the opaque regions are positioned corresponding to the protrusions 308 to shield all or part of light leakages within a sub-pixel. As shown in FIG. 4A and FIG. 4B, the first substrate structure (i.e. the upper substrate structure) 10 and the second substrate structure (i.e. the lower substrate structure) 20 are assembled and the space between them is filled with a liquid crystal layer 30 containing numerous liquid crystal molecules 302. The second substrate structure 20 includes a second substrate 202 on which a thin film transistor (TFT) (not shown) and passivation layer 203 are formed. A pixel electrode 204 is disposed above the passivation layer 203 and is covered with an alignment film 206. The first substrate structure 10 includes a first substrate 102, a color filter layer 103, a transparent electrode 104, the protrusion 308 and an alignment film 106. Also, the surface of the protrusion 308 is covered by the alignment film 106. The protrusion 308 provides a pre-tilt angle for the liquid crystal molecules 302 when no voltage is applied to the first substrate structure 10 and the second substrate structure 20.

In FIG. 4A, the first substrate structure 10 further includes a black matrix 408, and part of the black matrix 408 is used as the opaque region to shield all or part of the protrusion 308. In FIG. 4B, the metal layer 418 of the second substrate structure is used as the opaque region to shield all or part of the protrusion 308.

FIG. 5A~FIG. 5B are top views illustrating the black matrixes 408 of FIG. 4A, wherein the black matrix 408 of FIG. 5A covers half area of the protrusions 308, and the black matrix 408 of FIG. 5B covers all of the protrusions 308. It is, of course, understood by people in the related art that the patterns of the black matrix 408 are not limited to the patterns of FIG. 5A and FIG. 5B. Practically, the patterns of the black matrix 408, patterns of the protrusions 308, and percentage of the protrusions 308 covered by the black matrix 408 are determined according to the requirements of the applications.

Second Embodiment

In the second embodiment of the present invention, several slits are formed on the second substrate structure (i.e. the lower substrate structure) as an alignment controlling pattern in the TFT-LCD.

Figure 6:
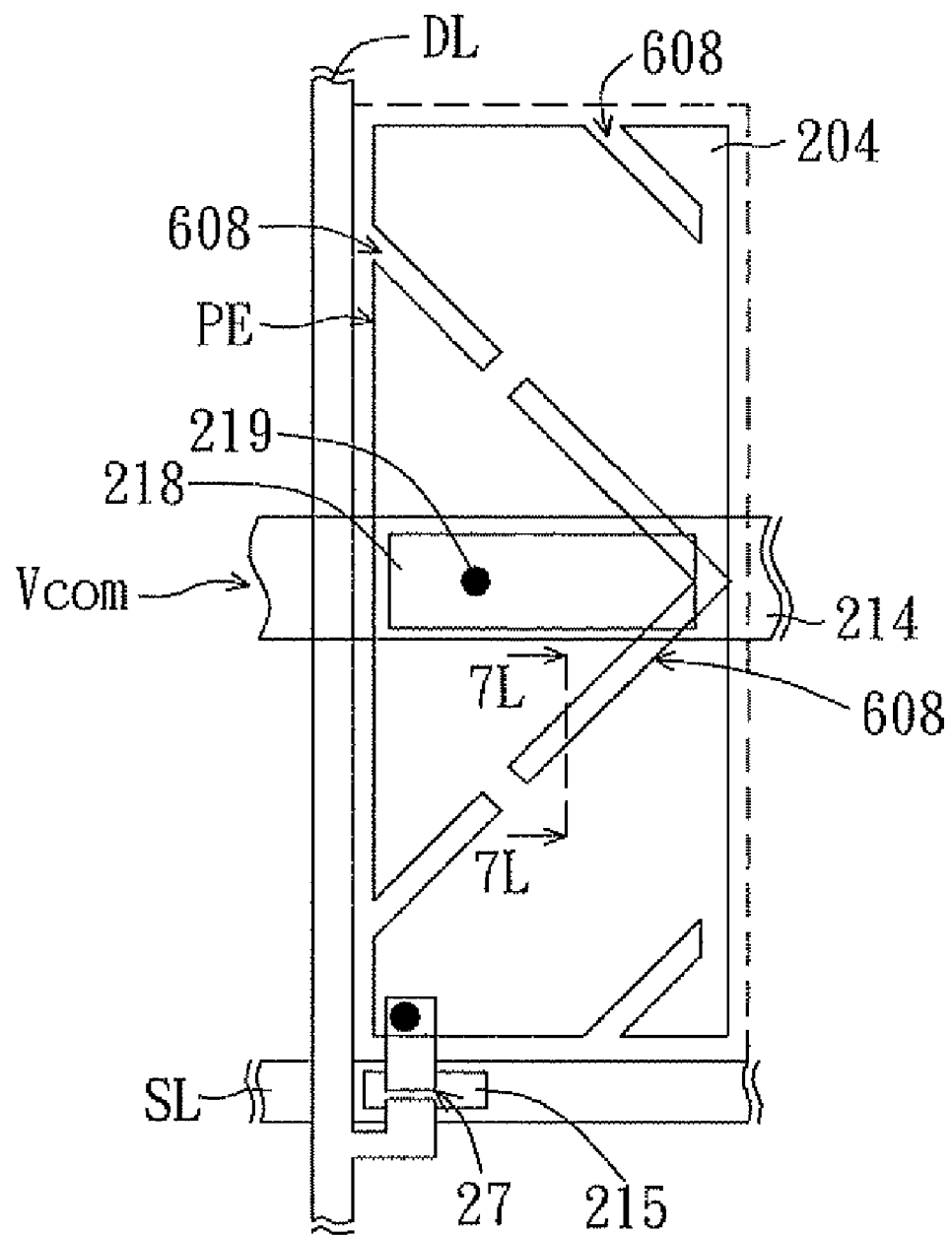
FIG. 6 illustrates the slits formed in a single sub-pixel of the TFT-LCD according to the second embodiment of the present invention.
Figure 7A:
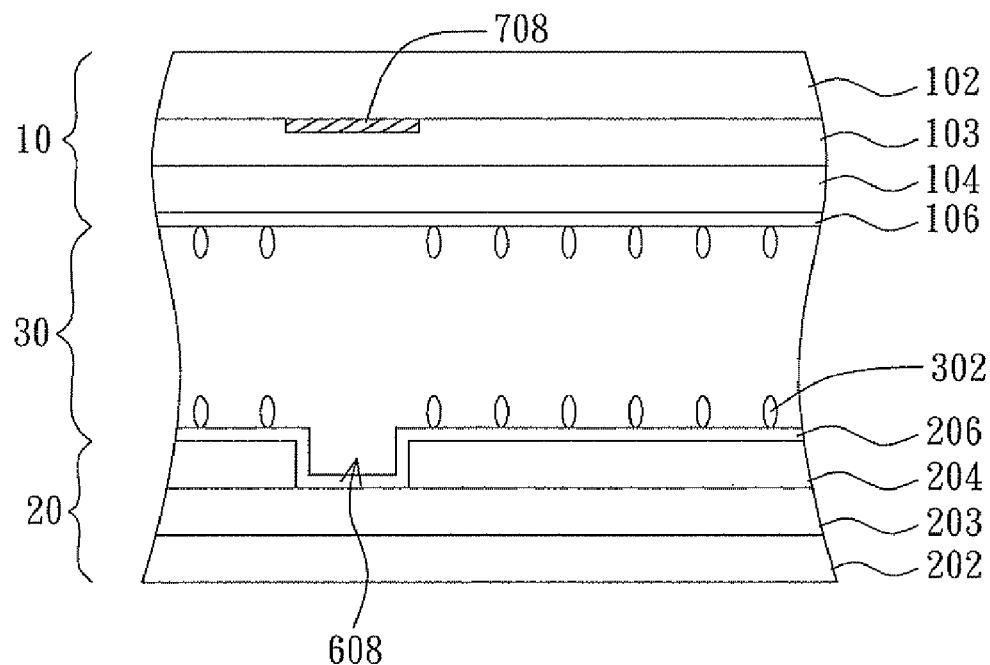
FIG. 7A~FIG. 7B are cross-sectional views taken along the line 7L-7L of FIG. 6, wherein a black matrix and a metal are used as opaque regions, respectively.
Figure 7B:
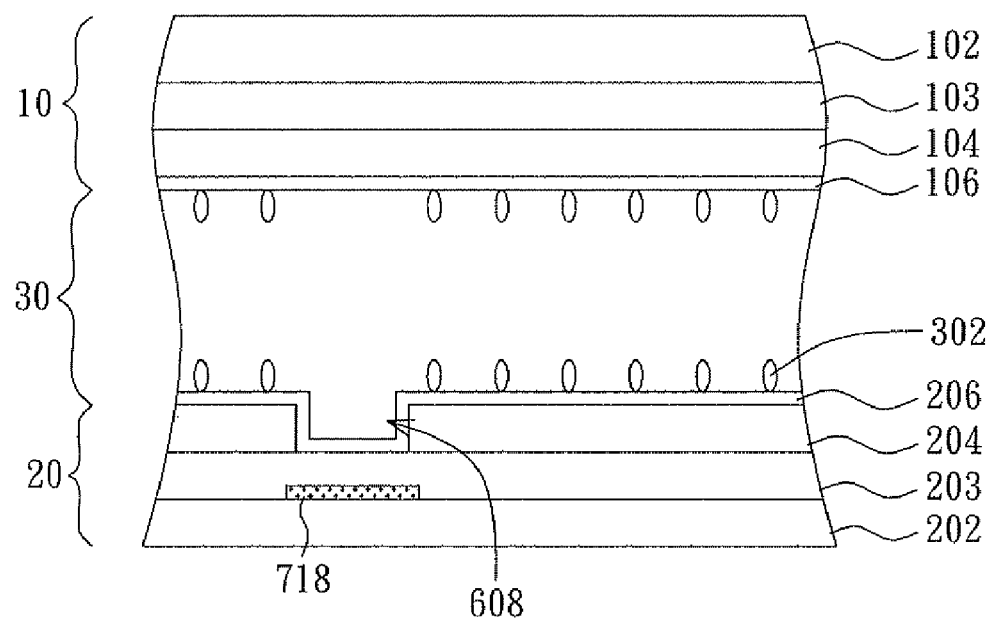
Figure 8B:
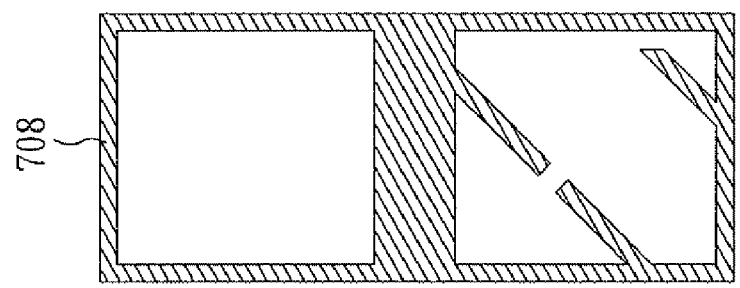
FIG. 8A~FIG. 8B are top views illustrating the black matrix of FIG. 7A covering half slits and all of slits, respectively.
Figure 8A:
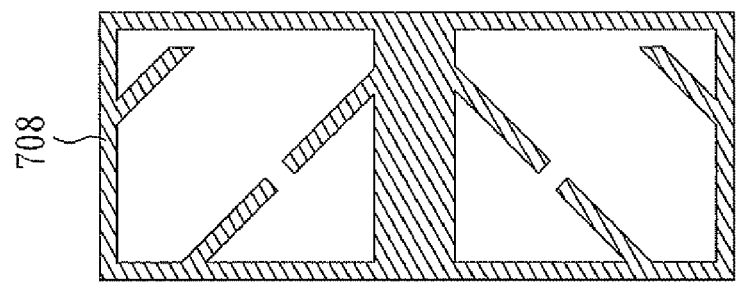

Referring to FIG. 6, FIG. 7A~FIG. 7B and FIG. 8A~FIG. 8B. FIG. 6 illustrates the slits formed in a single sub-pixel of the TFT-LCD according to the second embodiment of the present invention. FIG. 7A~FIG. 7B are cross-sectional views taken along the line 7L-7L of FIG. 6, wherein a black matrix and a metal are used as opaque regions, respectively. FIG. 8A~FIG. 8B are top views illustrating the black matrix of FIG. 7A covering half slits and all of slits, respectively.

As shown in FIG. 6, each sub-pixel (R, G or B sub-pixel) controlled by a data line and a scan line comprises a thin film transistor (TFT) 27 and a pixel electrode (PE) 204. A storage capacitor (CST) includes a common electrode (VCOM) 214 and/or at least one of a capacitor electrode 218 and a portion of the pixel electrode 204. By example, the capacitor electrode 218 (formed by patterning the second metal layer) is positioned above the common electrode (VCOM) 214, and the most upper pixel electrode 204 disposed on the capacitor electrode 218 and is electrically connected to the capacitor electrode 218 through the contact hole 219. Also, several slits 608 are formed on the second substrate structure (i.e. lower substrate structure) as the alignment controlling pattern. The purposes of multi-domains and wide viewing angle effect can bed achieved due to the existence of those slits 608. FIG. 6 also shows the positions of slits 608 within a single sub-pixel.

In the present embodiment of the invention, at least one of black matrix and metal used as the opaque regions are positioned corresponding to the slits 608 to shield all or part of light leakages within a sub-pixel. As shown in FIG. 7A and FIG. 7B, the first substrate structure (i.e. the upper substrate structure) 10 and the second substrate structure (i.e. the lower substrate structure) 20 are assembled and the space between them is filled with a liquid crystal layer 30 containing numerous liquid crystal molecules 302. The second substrate structure 20 includes a second substrate 202 on which a thin film transistor (TFT) (not shown) and passivation layer 203 are formed. A pixel electrode 204 is disposed above the passivation layer 203 and is covered with an alignment film 206. Each sub-pixel area can be divided into several domains by the slits 608 of the pixel electrode 204. When a voltage is applied to the substrates, a slanted electric field is generated adjacent to the edges of the pixel electrode (cut by the slits 608) 204 so as to cause the inclination and/or twist of LC molecules adjacent to the slits 608. Those inclined and/or twisted LC molecules affect the other LC molecules, so that multi-domains within a pixel and wide viewing angle of display can be obtained. The first substrate structure 10 includes a first substrate 102, a color filter layer 103, a transparent electrode 104, the protrusion 308, and an alignment film 106.

In FIG. 7A, the first substrate structure 10 further includes a black matrix 708, and part of the black matrix 708 is used as the opaque region to shield all or part of the slit 608. In FIG. 7B, the metal layer 718 of the second substrate structure 20 is used as the opaque region to shield all or part of the slit 608.

FIG. 8A~FIG. 8B are top views illustrating the black matrixes 708 of FIG. 7A, wherein the black matrix 708 of FIG. 8A covers half area of the slit 608, and the black matrix 708 of FIG. 7B covers all of the slits 608. It is, of course, understood by people in the related art that the patterns of the black matrix 708 are not limited to the patterns depicted in FIG. 8A and FIG. 8B. Practically, the patterns of the black matrix 708, patterns of the slits 608, and percentage of the slits 608 covered by the black matrix 708 are determined according to the requirements of the applications.

Third Embodiment

In the third embodiment of the present invention, the protrusions formed on the first substrate structure (i.e. the upper substrate structure) and several slits formed on the second substrate structure (i.e. the lower substrate structure) are used as the alignment controlling pattern in the TFT-LCD.

Figure 9:
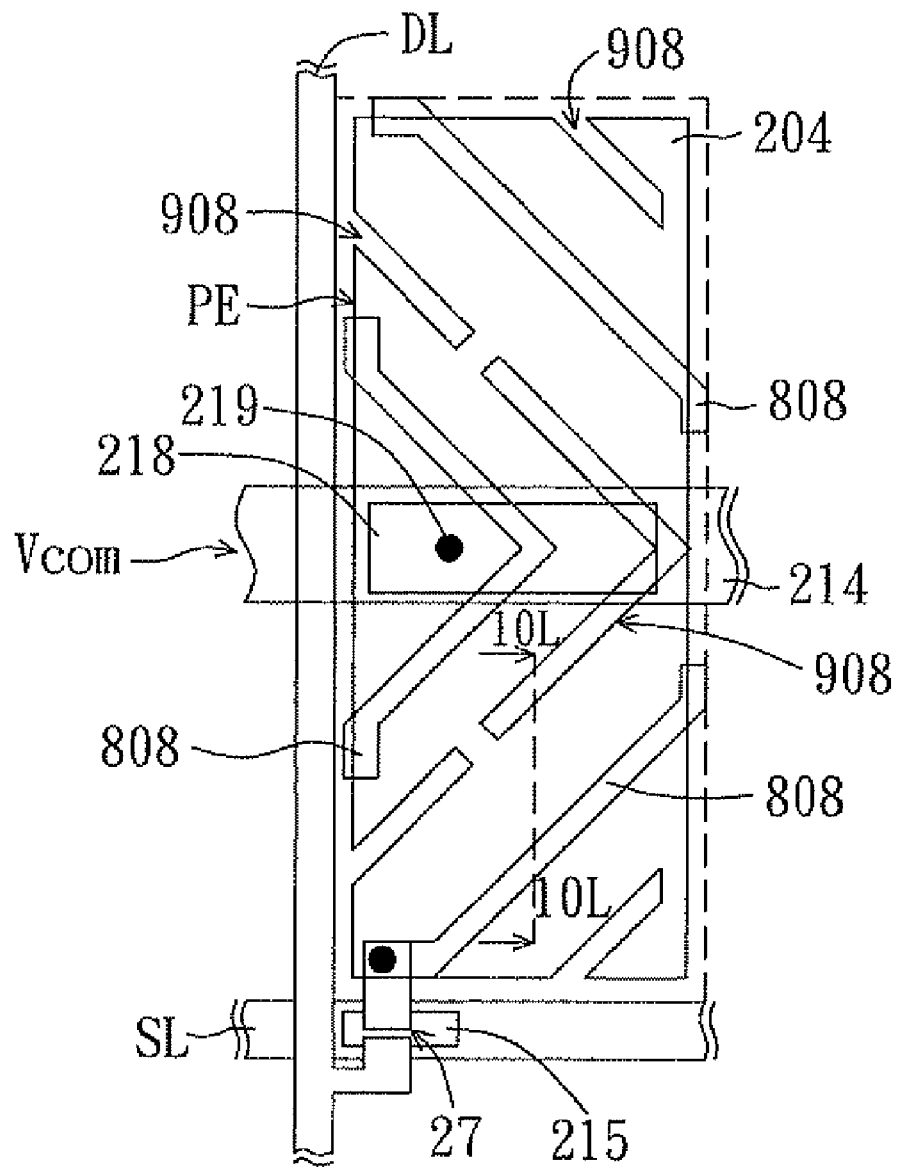
FIG. 9 illustrates the protrusions and slits formed in a single sub-pixel of the TFT-LCD according to the third embodiment of the present invention.
Figure 10A:
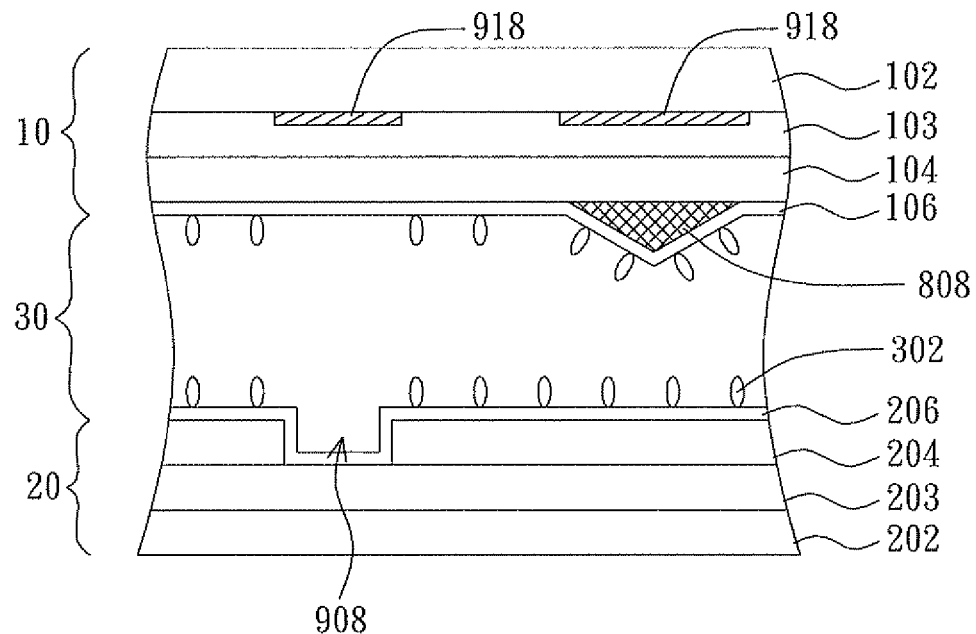
FIG. 10A~FIG. 10B are cross-sectional views taken along the line 10L-10L of FIG. 9, wherein a black matrix and a metal are used as opaque regions, respectively.
Figure 10B:
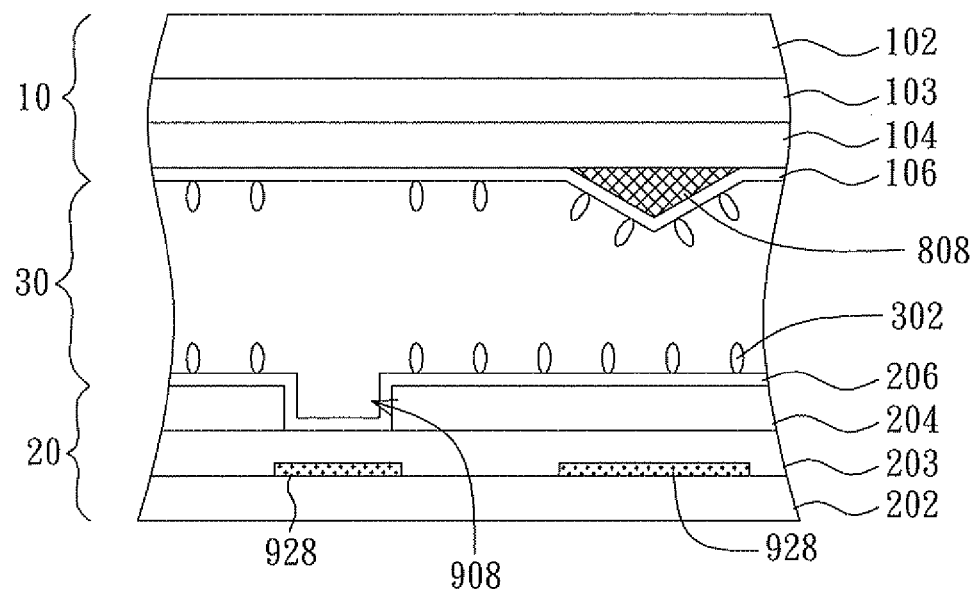
Figure 11B:
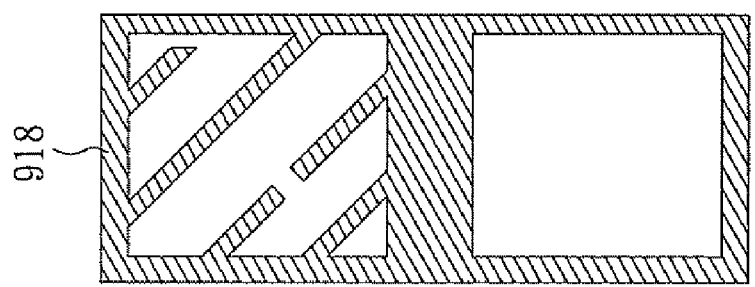
FIG. 11A~FIG. 11B are top views illustrating the black matrix of FIG. 10A covering half area and all of alignment controlling pattern (including slits and protrusions), respectively.
Figure 11A:
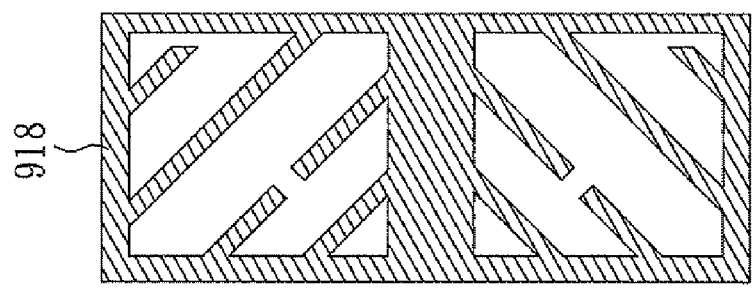

Referring to FIG. 9, FIG. 10A~FIG. 10B and FIG. 11A~FIG. 11B. FIG. 9 illustrates the protrusions and slits formed in a single sub-pixel of the TFT-LCD according to the third embodiment of the present invention. FIG. 10A~FIG. 10B are cross-sectional views taken along the line 10L-10L of FIG. 9, wherein a black matrix and a metal are used as opaque regions, respectively. FIG. 11A~FIG. 11B are top views illustrating the black matrix of FIG. 10A covering half area and all of alignment controlling pattern (including slits and protrusions), respectively.

As shown in FIG. 9, each sub-pixel (R, G or B sub-pixel) controlled by a data line and a scan line comprises a thin film transistor (TFT) 27 and a pixel electrode (PE) 204. A storage capacitor (CST) includes a common electrode (VCOM) 214 and/or at least one of a capacitor electrode 218 and a portion of the pixel electrode 204. By example, the capacitor electrode 218 (formed by patterning the second metal layer) is positioned above the common electrode (VCOM) 214, and the most upper pixel electrode 204 disposed on the capacitor electrode 218 and is electrically connected to the capacitor electrode 218 through the contact hole 219. Also, several protrusions 808 and slits 908 of the pixel electrode 204 are respectively formed on at least one of the first and second substrate structure to be the alignment controlling pattern. The purposes of multi-domains and wide viewing angle effect can bed achieved due to the existence of those protrusions 808 and slits 908. FIG. 9 clearly shows the positions of protrusions 808 and slits 908 within a single sub-pixel according to the third embodiment of the present invention.

In the present embodiment of the invention, at least one of black matrix and metal used as the opaque regions are positioned corresponding to the protrusions 808 and the slits 908 for completely or partially shielding the light leakages within a sub-pixel. As shown in FIG. 10A and FIG. 10B, the first substrate structure (i.e. the upper substrate structure) 10 and the second substrate structure (i.e. the lower substrate structure) 20 are assembled in parallel and the space between them is filled with a liquid crystal layer 30 containing numerous liquid crystal molecules 302. The first substrate structure 10 includes a first substrate 102, a color filter layer 103, a transparent electrode 104, and an alignment film 106. Also, the protrusions 808 are formed on the transparent electrode 104. The second substrate structure 20 includes a second substrate 202, a thin film transistor (TFT) (not shown), a passivation layer 203, a pixel electrode 204, and an alignment film 206. Also, several slits 908 are formed on the pixel electrode 204 to divide each sub-pixel area into several domains.

In FIG. 10A, the first substrate structure 10 further includes a black matrix 918, and part of the black matrix 918 is used as the opaque region to shield all or part of the alignment controlling pattern (including the protrusions 808 and the slits 908). In FIG. 10B, the metal layer 928 of the second substrate structure 20 is used as the opaque region to shield all or part of the protrusions 808 and the slits 908.

FIG. 11A~FIG. 11B are top views illustrating the black matrixes 918 of FIG. 10A, wherein the black matrix 918 of FIG. 11A covers half area of the alignment controlling pattern (including the protrusions 808 and the slits 908), and the black matrix 918 of FIG. 11B covers all of protrusions 808 and the slits 908. It is, of course, understood by people in the related art that the patterns of the black matrix 918 are not limited to the patterns of FIG. 11A and FIG. 11B. Practically, the patterns of the black matrix 918, the patterns of the alignment controlling pattern, and percentage of the alignment controlling pattern (including the protrusions 808 and the slits 908) covered by the black matrix 918 are determined according to the requirements of the applications.

Fourth Embodiment

Figure 12:
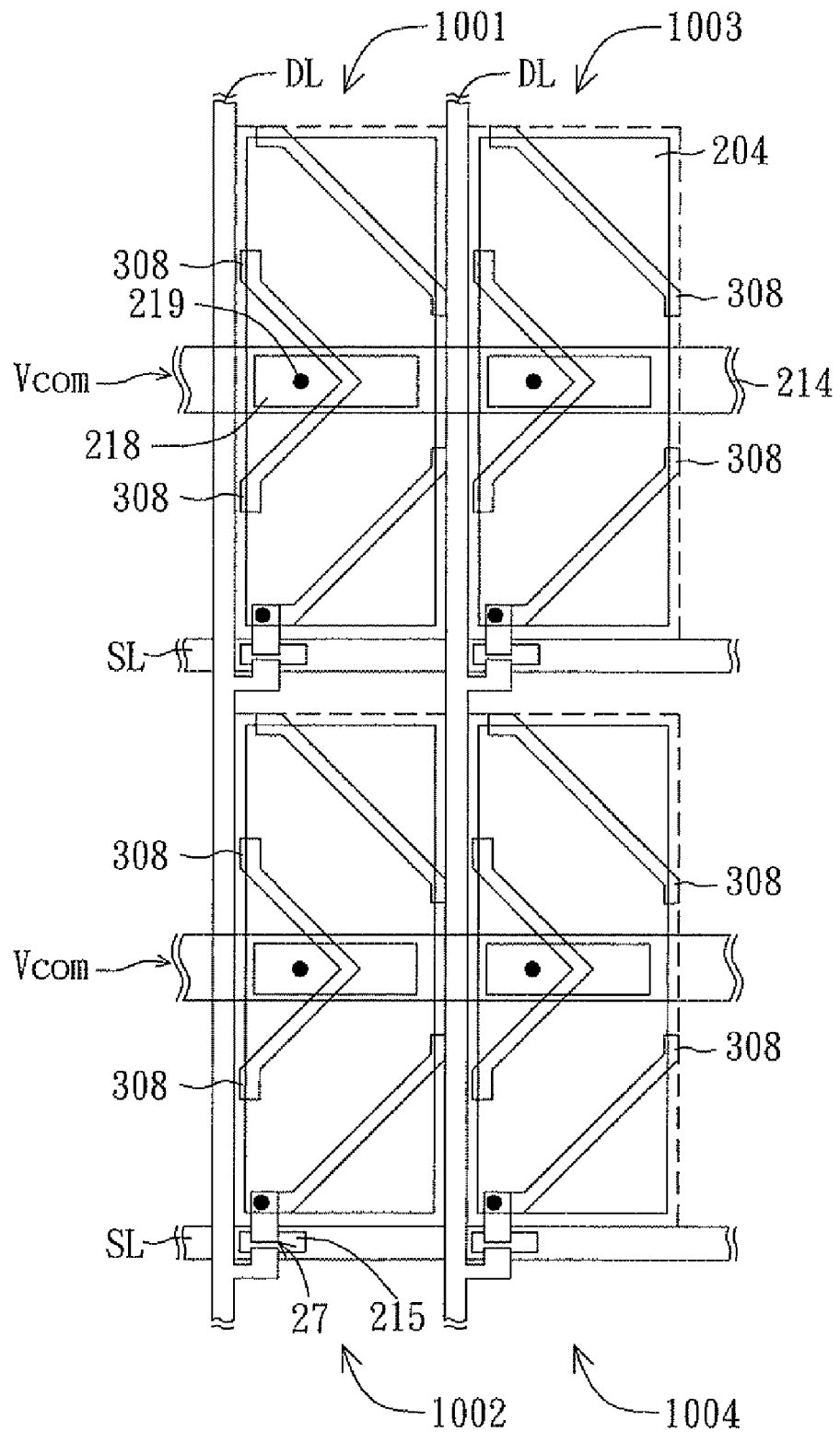
FIG. 12 illustrates each pixel of the TFT-LCD having four sub-pixels according to the fourth embodiment of the present invention, wherein the protrusions are formed in the sub-pixels.

FIG. 12 illustrates each pixel of the TFT-LCD having four sub-pixels according to the fourth embodiment of the present invention, wherein the protrusions are formed in the sub-pixels. Besides the first, second, and third sub-pixels (ex. R, G, and B sub-pixels), a fourth sub-pixel can be further incorporated with those sub-pixels to increase a variety of pixel colors. The light emitted from the fourth sub-pixel could be colorless, red, green, blue, or other colors assigned to areas on the CIE Chromaticity Diagram (such as purple, yellow-green, orange-red, red-brown, yellow, indigo blue, and etc.). Although four sub-pixels are taken as illustration in the fourth embodiment of the present invention, the present invention is not limited herein. More than four sub-pixels, such as six or eight sub-pixels could be incorporated in a single pixel. Also, the protrusions are constructed in the four sub-pixels to be the alignment controlling pattern in the TFT-LCD according to the fourth embodiment, but not-limited it, the other typed of the alignment controlling pattern can to used, such as the slits, the slits and the protrusions.

Figure 13:
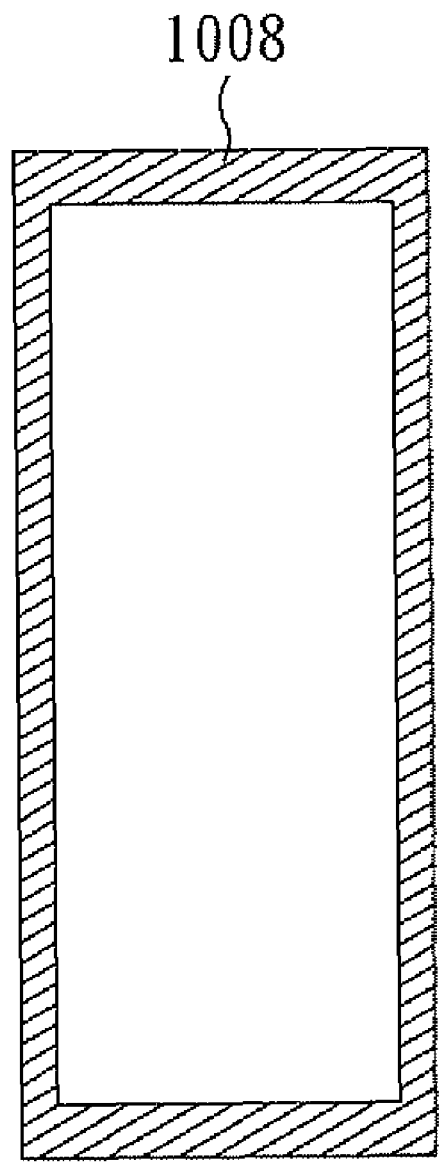
FIG. 13 is a top view illustrating a black matrix formed in the fourth sub-pixel of FIG. 12.

As shown in FIG. 12, each pixel includes the first sub-pixel 1001, the second sub-pixel 1002, the third sub-pixel 1003, and the fourth sub-pixel 1004. The alignment controlling pattern (such as formed by the protrusions 308) in each of the sub-pixel areas 1001-1004 is substantially identical to that in the first embodiment (see FIG. 3). In the present embodiment of the invention, at least one of black matrix and metal can be used as the opaque regions to shield all or part of protrusions 308. For example, if the colors emitted from the first sub-pixel 1001, the second sub-pixel 1002, and the third sub-pixel 1003 are red, green, and blue, the pattern of the opaque region shown in FIG. 5A or FIG. 5B is substantially similar to the pattern of the black matrix of the first embodiment of the present invention (to shield all or part of the protrusion 308). If the light emitted from the fourth sub-pixel 1004 is colorless, the pattern of opaque region could be designed as a frame-shape is surrounding the fourth sub-pixel 1004; for example, the opaque region could be a black matrix following the scan line and data line, or a black matrix corresponding to the color filter layer. FIG. 13 is a top view illustrating a black matrix formed in the fourth sub-pixel of FIG. 12. As shown in FIG. 13, the black matrix 1008 formed in the fourth sub-pixel 1004 functions as an opaque region, and the pattern of the black matrix 1008 is corresponding to the scan line and data line. The protrusions 308 in the fourth sub-pixel 1004 are not shielded by the black matrix 1008. It is, of course, understood by people in the related art that the patterns of the black matrix are not limited to the pattern of FIG. 12. If fourth sub-pixel 1004 is other color and incorporated in the pixel structure, the pattern of the black matrix could be illustrated in at least one of the first, second, and third embodiments.

Pixel Structure of Display and Shielding Experiments

The shielding experiments are conducted by constructing several pixel structures of display, and each of these pixel structures comprises:

(1) a plurality of first, second, and third sub-pixels, respectively emitting red, green, and blue colors of light;

(2) a plurality of alignment controlling patterns, respectively formed in the first, second and third sub-pixels so as to control the alignment directions of the LC molecules; for example: the alignment controlling patterns could be the protrusions as demonstrated in the first embodiment of the present invention, or the slits as demonstrated in the second embodiment of the present invention, or the protrusions together with the slits as demonstrated in the third embodiment of the present invention;

(3) a plurality of opaque regions, respectively formed in the first, second, and third sub-pixels and corresponding to the alignment controlling patterns, so that the alignment controlling patterns of at least two of sub-pixels are shielded by the opaque regions having different areas. In other words, in the shielding experiments, at least two groups of sub-pixels adapted to emit different colors of the RGB sub-pixels are selected, and the alignment controlling patterns thereof are covered by the opaque regions having different areas.

Figure 14:
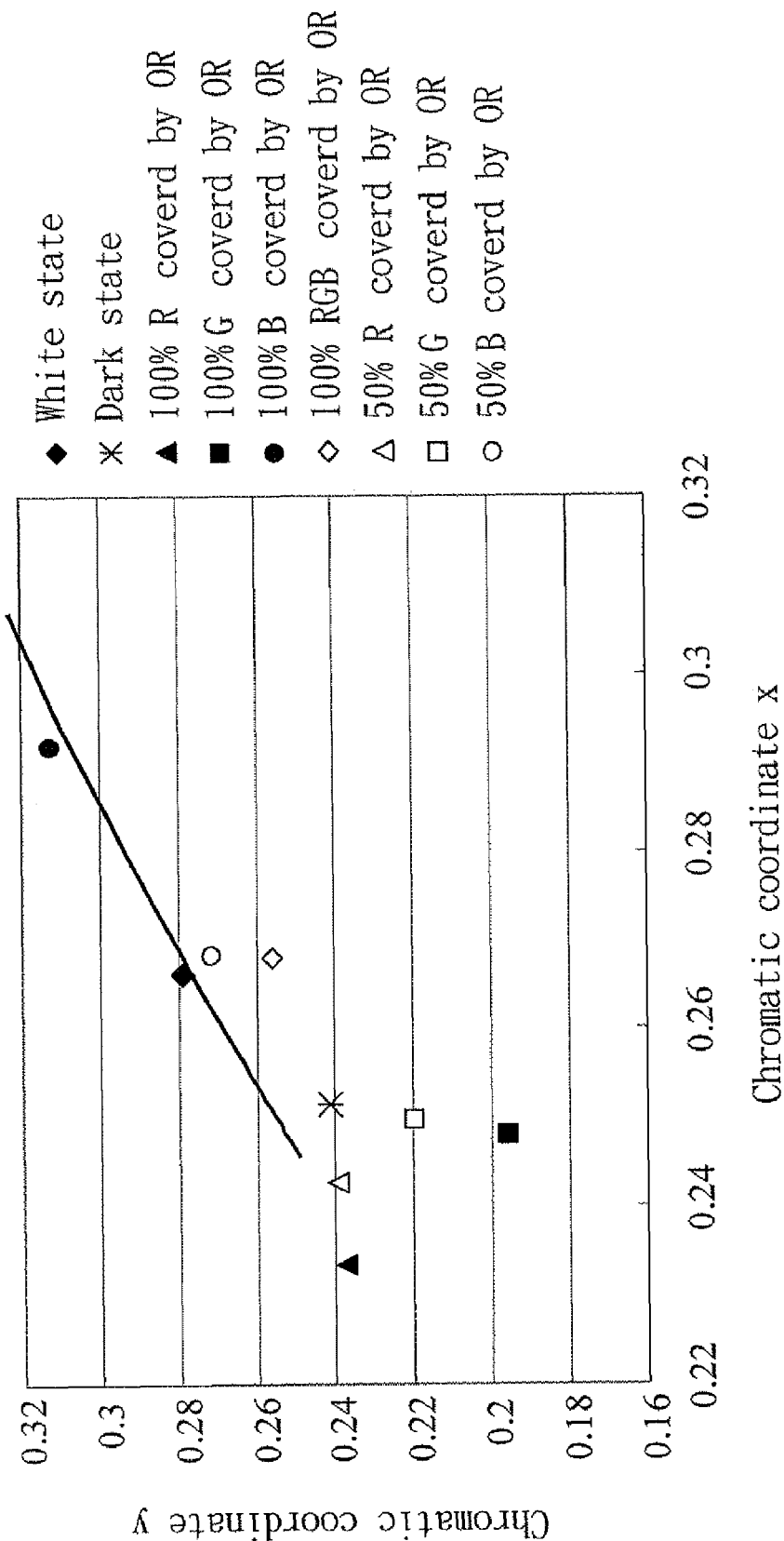
FIG. 14 is a chromaticity diagram showing color performance of display according to the shielding experimental results of the present invention.

FIG. 14 is a chromaticity diagram showing color performance of display according to the shielding experimental results of the present invention.

♦, experimental result showing the display in a white state of the chromaticity diagram when no opaque region (OR) is constructed within the sub-pixels, (x, y)=(0.266, 0.28).

*, experimental result showing the display in a dark state of the chromaticity diagram when no opaque region is constructed within the sub-pixels, (x, y)=(0.251, 0.24).

▲, experimental result showing the display in a dark state of the chromaticity diagram when all the alignment controlling patterns in the R sub-pixels are completely shielded by the opaque regions, (x, y)=(0.232, 0.237).

■, experimental result showing the display in a dark state of the chromaticity diagram when all the alignment controlling patterns in the G sub-pixels are completely shielded by the opaque regions, (x, y)=(0.247, 0.196).

●, experimental result showing the display in a dark state of the chromaticity diagram when all the alignment controlling patterns in the B sub-pixels are completely shielded by the opaque regions, (x, y)=(0.291, 0.313).

◊, experimental result showing the display in a dark state of the chromaticity diagram when all the alignment controlling patterns in the R, G and B sub-pixels are completely shielded by the opaque regions, (x, y)=(0.267, 0.255).

Δ, experimental result showing the display in a dark state of the chromaticity diagram when half area of the alignment controlling patterns in the R sub-pixels are shielded by the opaque regions, (x, y)=(0.242, 0.240).

□, experimental result showing the display in a dark state of the chromaticity diagram when half area of the alignment controlling patterns in the G sub-pixels are shielded by the opaque regions, (x, y)=(0.250, 0.220).

○, experimental result showing the display in a dark state of the chromaticity diagram when half area of the alignment controlling patterns in the B sub-pixels are shielded by the opaque regions, (x, y)=(0.268, 0.272).

The results of FIG. 14 have indicated that:

(1) When the alignment controlling patterns in the R sub-pixels are shielded by the opaque regions, the chromatic coordinates (i.e. the chromaticity diagram) in the dark state are positioned at left sides of the diagram, and are trend toward to left of the diagram. Moreover, the position representing the R sub-pixels being are completely shielded (i.e. ▲) is more left than being half shielded (i.e. Δ).

(2) when the alignment controlling patterns in the G sub-pixels are shielded by the opaque regions, the chromatic coordinates in the dark state approach to the left-down of the diagram, and are trend toward to left-down of the diagram. Moreover, the position representing the G sub-pixels being are completely shielded (i.e. ■) is more left-down than being half shielded (i.e. □).

(3) when the alignment controlling patterns in the B sub-pixels are shielded by the opaque regions, the chromatic coordinates in the dark state approach to the right-upper of the diagram, and are trend toward to left-down of the diagram. Moreover, the position representing the G sub-pixels being are completely shielded (i.e. ●) is more right-upper than being half shielded (i.e. ○).

Therefore, by adjusting the shield conditions (ex: proportions and/or slits) of the alignment controlling patterns in the R, G and B sub-pixels, the chromatic coordinate of the dark-state display can be controlled and moved to the expected position according to the practical application. Thus, the color of display, especially in the dark state, can be effectively improved by the present invention.

Figure 15:
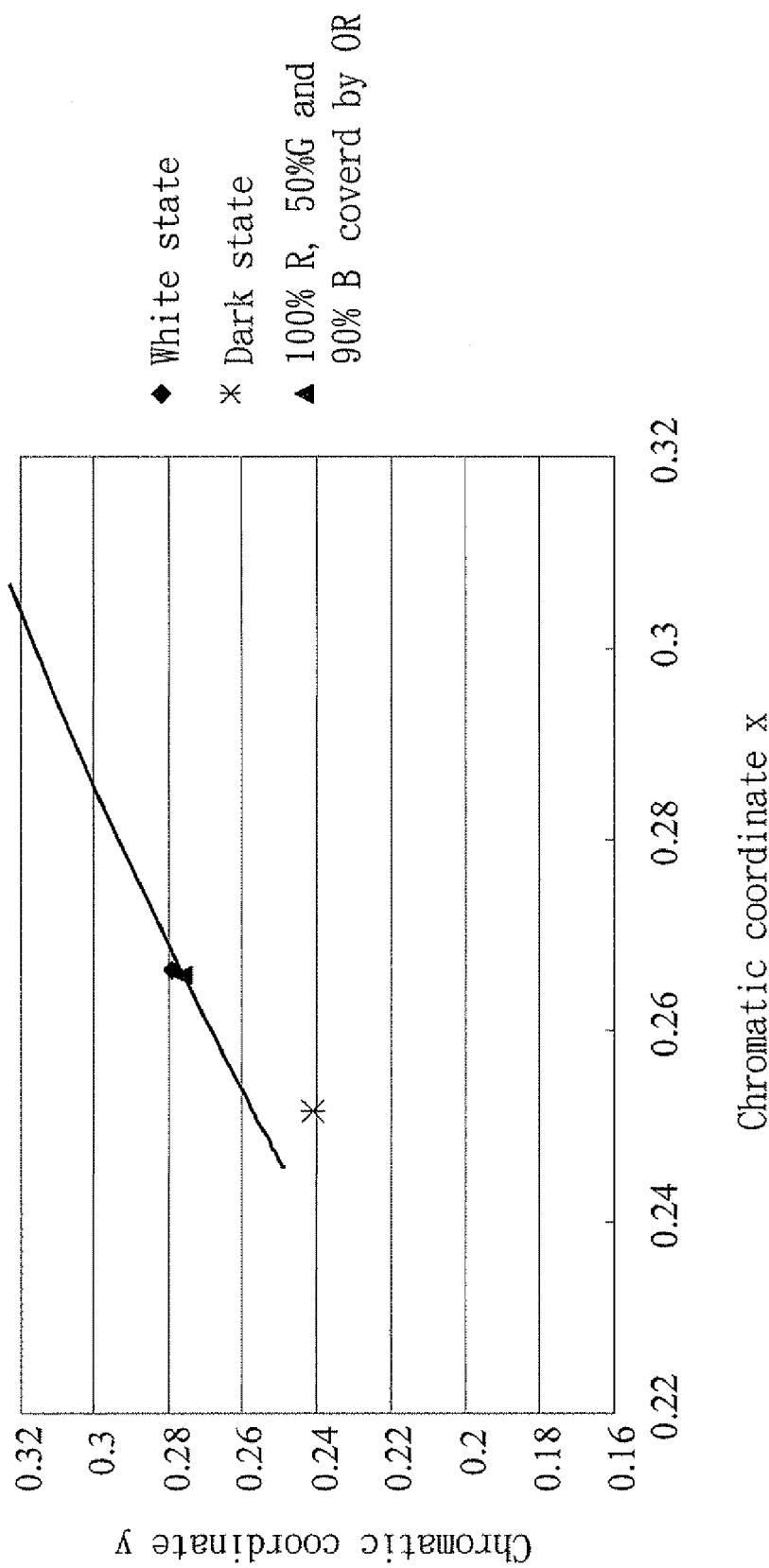
FIG. 15 is a chromaticity diagram showing color performance of a display according to one of the shielding experimental results of the present invention.

FIG. 15 is a chromaticity diagram showing color performance of a display according to one of the shielding experimental results of the present invention. In FIG. 15, ▲ and * are the experimental results showing the display in the white and dark states when no opaque region (OR) is constructed within the sub-pixels. ▲ is the experimental result showing the display in a dark state when about 100% area of the alignment controlling patterns in the R sub-pixels, about 50% area of the alignment controlling patterns in the G sub-pixels, and about 90% area of the alignment controlling patterns in the G sub-pixels are shielded by the opaque regions, respectively. The results of FIG. 15 indicate that the positions of ▲ and ♦ substantially overlapped or substantially matched together, so that the opaque regions provided by the present invention effectively improve the color of LCD display in the dark state.

Moreover, it is noted that light can penetrate the protrusions. Although covering the protrusions could reduce the light leakage in the dark state and increase the color contrast, the brightness is decreased. In general, the brightness value of the G sub-pixel is highest, and the brightness value of B sub-pixel is lowest. In other words, the B sub-pixel provides the least of the overall brightness value. In the practical application, substantially smaller proportion of the protrusions in the G sub-pixels and substantially greater or all proportion of the protrusions in the B sub-pixels should be shielded, so as to maintain the brightness at a certain value in the consideration of the brightness issue and to improve the colors in the dark status. In other words, the majority of the protrusions or the entire protrusions in some color subs-pixels (such as blue sub-pixels or likes) should be shield for the lower supply value of the brightness. As shown in FIG. 14, the color of the display in a dark state when about 50% areas of the alignment controlling patterns in the B sub-pixels are shielded by the opaque regions (i.e. ○) is not substantially identical but still close to the color of the display in a white state when no opaque region (OR) is constructed within the sub-pixels (i.e. ♦).

According to the results of shielding experiments, the color of LCD display, especially in the dark state, can be improved by any one of the conditions listed below.

(1) The area of the alignment controlling patterns in the B sub-pixels shielded by the opaque regions is substantially greater than that in the R sub-pixels shielded by the opaque regions.

(2) The area of the alignment controlling patterns in the B sub-pixels shielded by the opaque regions is substantially greater than that in the G sub-pixels shielded by the opaque regions.

(3) The area of the alignment controlling patterns in the B sub-pixels is shielded by the opaque regions, preferred, the area in the B sub-pixels is about 50% to about 100%

(4) The area of the alignment controlling patterns in the G sub-pixels is shielded by the opaque regions, preferred, the area in the G sub-pixels is substantially equal to or substantially smaller than 50%.

(5) The area of the alignment controlling patterns in the R sub-pixels is shielded by the opaque regions, preferred, the area in the R sub-pixels is substantially equal to or substantially smaller than 50%.

Additionally, there is no limitation of the TFT types when the present invention is applied to a TFT-LCD. The TFT type of the display comprises a bottom gate structure, a top gate structure, or others. The TFT type of the display could be a n-type TFT, p-type TFT, or a combination thereof, manufacturing by the polysilicon, amorphous silicon, micro-crystalline silicon mono-crystalline silicon process, other's process, or combinations thereof. Also, the first and second substrates of the display can be made of various materials, for example, at least one of them could be the transparent substrates (such as glass, quartz, or the like), or the opaque substrates (such as ceramic, silicon, or the like), or the flexible plastic substrates (such as robber, polyester, polyamide, polyolefines poly-oxides, or the likes).

Moreover, the position of color filter 103 is not limited in the present invention although it is set in the first substrate structure in the first to fourth embodiments. The present invention is also applicable to a COA (color filter on array) type of the LCD (or known as AOC (array on color filter) type of the LCD, which means the color filter is disposed on the second substrate structure (having one or more TFTs in one pixel) to increase the alignment accuracy between the black matrix and the data lines.

It is noted that the present invention is also applicable to different types of displays, including transmissive type, reflective type, and transflective type display. If the pixel electrode on the second substrate structure is made of transparent material including transparent metal oxide (such as indium zinc oxide, indium tin oxide, aluminum zinc oxide, cadmium zinc oxide, the likes, or combinations thereof), the display could be a transmissive type display, and could be one of the applicable displays of the present invention. If the pixel electrode on the second substrate structure is made of reflective material including metal (such as titanium, aluminum, chromium, tantalum, gold, silver, copper, iron, neodymium, molybdenum, and the likes), alloy, or combinations thereof, the display could be a reflective type display, and could be one of the applicable displays of the present invention. If the pixel electrode on the second substrate structure is made of the transparent and reflective materials (i.e. a portion of pixel electrode made of the transparent material and the other portions of pixel electrode made of the reflective material), the display could be a transflective type display, and could be one of the applicable displays of the present invention. Accordingly, the first, second, and third sub-pixels illustrated in the above-mentioned embodiments of the present inventions could comprise the pixel electrodes made of transparent material, reflective material, or combinations thereof. The fourth sub-pixels mentioned in the fourth embodiment could be selectively incorporated in the pixel structure, and the pixel electrodes of the fourth sub-pixels could be made of transparent material, reflective material, or combinations thereof.

In the above-mentioned embodiments, although the metal layer and the black matrix are respectively formed on the first and second substrates, but not-limited it in those embodiments. The metal layer and the black matrix can be simultaneously formed on the first and second substrates to reduce the effect of light leakage. In other words, the black matrix formed on the second substrate and the metal layer formed on the first substrate is also applicable. Besides, the black matrix could be made of metal (such as titanium, aluminum, chromium, tantalum, gold, silver, copper, iron, neodymium, molybdenum, and the likes), alloy, metal oxide, metal nitride, or the composition comprising metal, or polymers (such as black photoresist, polyester, and the likes), or combinations thereof. If organic photoresist is selected as the material to form the black matrix, at least one of the black photoresist and part of the color photoresists (such as at least two color photoresists are overlapped each other), forms on the predetermined position of the black matrix. If metal is selected as the material for forming the black matrix of the present invention, the metal layer is patterned to form the black matrix at the predetermined position. If both of the organic material and metal are used for forming the black matrix of the present invention, the organic material layer could be formed above or under the metal layer. Besides, the sub-pixels are not limited in the rectangular or square shape, as illustrated in the above-mentioned embodiments of the present invention. The shapes of sub-pixels could be polygonal, such as rhombic, hexagonal, pentagon, trapeziform, or the others. Also, the shapes of the slits are not limited herein, and the shapes of the slits such as substantial branches, comb, substantial fishbones, V-letter, W-letter, X-letter, the like, or a combination thereof. Furthermore, the storage capacitor of the above-mentioned embodiments of the present invention includes the common electrode and a portion of the second metal layer. However, the storage capacitor could be constructed by the first metal layer and/or the second metal layer and a portion of pixel electrode. Additionally, the protrusions of the above-mentioned embodiments of the present invention are formed on the transparent electrode of the first substrate structure (as shown in FIG. 4A, FIG. 4B, FIG. 10A, FIG. 10B), however, the protrusions could be formed on the alignment film. Also, the positions of the alignment controlling patterns, including at least one of slit and protrusion, are not limited as the illustration in the above-mentioned embodiments of the present invention. The protrusions could be formed on the second substrate (upper) structure or the first substrate structure. The slits could be formed on the first substrate (lower) structure or the second substrate structure. If the alignment controlling patterns in the application includes the protrusions and the slits, the protrusions and the slits could be respectively formed on the second and first substrates (i.e. opposite to the illustration of FIG. 10A) or the protrusions and the slits could be simultaneously formed on at least one of the second and first substrate. Besides, all of the alignment controlling patterns or portion of the alignment controlling patterns formed on the first and second substrates could be the protrusions only or slits only.

The above-description is a detailed illustration for a variety of preferred embodiments of the present invention. The embodiments should not be construed as limiting the scope of the present invention. Rather, it is intended to cover various modifications and similar arrangements included within the spirit and scope of the appended claims, the scope of which should be accorded the broadest interpretation so as to encompass all such modifications and similar structure.

What is claimed is:

1. A method for manufacturing a pixel structure of a display including a first substrate, a second substrate, and a liquid crystal (LC) layer disposed therebetween, and the method comprising:
    forming a plurality of first, second, and third sub-pixels;
    forming a plurality of alignment controlling patterns in the first, second, and third sub-pixels;
    forming a plurality of opaque regions in the first, second, and third sub-pixels and substantially aligned with at least a portion of the alignment controlling patterns, so that the opaque regions are substantially overlapped with the at least a portion of the alignment controlling patterns and area percentages of the alignment controlling patterns shielded by the opaque regions in at least two of the sub-pixels are substantially different from each other.

2. The method according to claim 1, further comprising forming a plurality of fourth sub-pixels, so that the alignment controlling patterns are formed in the fourth sub-pixels.

3. The method according to claim 2, wherein each corresponding opaque region substantially surrounds each fourth sub-pixel.

4. A method for manufacturing a display, comprising:
    providing a first substrate structure and a second substrate structure;
    forming a plurality of first, second, and third sub-pixels on the first substrate structure and the second substrate structure;
    forming a plurality of alignment controlling patterns in the first, second, and third sub-pixels;
    forming a plurality of opaque regions in the first, second, and third sub-pixels and substantially aligned with at least a portion of the alignment controlling patterns, so that the opaque regions are substantially overlapped with the at least a portion of the alignment controlling patterns and area percentages of the alignment controlling patterns shielded by the opaque regions in at least two of the sub-pixels are substantially different from each other; and
    assembling a liquid crystal (LC) layer between the first substrate structure and the second substrate structure.

5. The method according to claim 4, wherein the alignment controlling patterns comprise a plurality of protrusions, formed in the first substrate structure in the first, second, and third sub-pixels.

6. The method according to claim 4, wherein the alignment controlling patterns comprise a plurality of slits, formed in the second substrate structure in the first, second, and third sub-pixels.

7. The method according to claim 4, wherein the alignment controlling patterns comprises:
    a plurality of protrusions, formed in the first substrate structure in the first, second, and third sub-pixels; and
    a plurality of slits, formed at a pixel electrode of the second substrate structure in the first, second, and third sub-pixels.

8. The method according to claim 4, wherein the display comprises a plurality of black matrixes in the first, second, and third sub-pixels, and the opaque regions comprise at least part of the black matrixes.

9. The method according to claim 4, wherein the display comprises a plurality of metal layers in the first, second, and third sub-pixels, and the opaque regions comprise at least part of the metal layers.

10. The method according to claim 4, further comprising forming a plurality of fourth sub-pixels, so that the alignment controlling patterns are formed in the fourth sub-pixels.

11. The method according to claim 10, wherein each corresponding opaque region substantially surrounds each fourth sub-pixel.

* * * * *